United States Patent
Appiah et al.

(10) Patent No.: US 10,749,868 B2
(45) Date of Patent: Aug. 18, 2020

(54) REGISTRATION OF THE SAME DOMAIN WITH DIFFERENT CLOUD SERVICES NETWORKS

(71) Applicant: Microsoft Technology Licensing, LLC, Redmond, WA (US)

(72) Inventors: Madan R. Appiah, Redmond, WA (US); Maciej J. Cupial, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 16/145,532

(22) Filed: Sep. 28, 2018

(65) Prior Publication Data
US 2020/0007541 A1    Jan. 2, 2020

Related U.S. Application Data

(60) Provisional application No. 62/692,320, filed on Jun. 29, 2018.

(51) Int. Cl.
*H04L 29/06*    (2006.01)
*H04L 29/12*    (2006.01)
*H04L 29/08*    (2006.01)

(52) U.S. Cl.
CPC ...... *H04L 63/0884* (2013.01); *H04L 61/3015* (2013.01); *H04L 63/0807* (2013.01);
(Continued)

(58) Field of Classification Search
CPC ............ H04L 63/0884; H04L 63/0807; H04L 63/0815; H04L 63/102; H04L 61/3015; H04L 67/1095
See application file for complete search history.

(56) References Cited

U.S. PATENT DOCUMENTS

| 2003/0105810 A1 | 6/2003 | Mccrory et al. |
| 2005/0007263 A1 | 1/2005 | Zhou |
| 2014/0123296 A1* | 5/2014 | Subramanian ......... H04L 67/10 726/26 |

FOREIGN PATENT DOCUMENTS

| EP | 2336886 A2 | 6/2011 |
| EP | 2624501 A1 | 8/2013 |
| WO | 2015163799 A1 | 10/2015 |

OTHER PUBLICATIONS

"International Search Report and Written Opinion Issued in PCT Application No. PCT/US19/038363", dated Oct. 25, 2019, 23 Pages.

* cited by examiner

*Primary Examiner* — Hee K Song
(74) *Attorney, Agent, or Firm* — Fiala & Weaver P.L.L.C.

(57) ABSTRACT

Embodiments described herein are directed to the registration of the same domain with different cloud services networks. For example, systems and methods described herein enable registering a domain in a cloud services network wherein the same domain is also concurrently registered in another cloud services network. Systems and methods described herein further enable selecting one of a plurality of cloud-based identity providers to process a request to authenticate a user associated with a domain that is registered in more than one cloud services network and generating an authentication response in accordance with the selection. Systems and methods described herein also enable the federation of user authentication requests from different cloud services networks to the same enterprise identity provider.

20 Claims, 6 Drawing Sheets

(52) U.S. Cl.
CPC ........ *H04L 63/0815* (2013.01); *H04L 63/102* (2013.01); *H04L 67/1095* (2013.01)

REGISTRATION OF THE SAME DOMAIN WITH DIFFERENT CLOUD SERVICES NETWORKS

CROSS REFERENCE TO RELATED APPLICATIONS

This application claims priority to U.S. Provisional Patent Application No. 62/692,320, entitled "Dual Federation for a Directory Service" and filed on Jun. 29, 2018, the entirety of which is incorporated by reference herein.

BACKGROUND

Secure digital identity has emerged as the most frequent and vital 'traveler' along the enterprise technology thoroughfare that connects more users to more networks on more devices in more places than ever thought possible. Given this robust computing roadway along which all digital identities must journey, the need for fortified and agile identification management systems is paramount. These necessary identification management systems must work tirelessly to mitigate security breaches, avoid slowing down essential network and cloud functionality, and prevent the occurrence of system failure and user error. However, these daunting missions are all the more complicated by the sheer volume of cross-network tasks executed by an enterprise's sphere of users every day. For example, that sphere may include the digital identities of employees, contractors, clients, customers, vendors, suppliers, trading partners, sister company employees, acquisition and merger parties, investors, and any other affiliate entity. All of these digital identities must then be authenticated to be allowed access to a countless variety of databases, content repositories, proprietary files, software as a service (SaaS) sites, intranets, and third-party industry hubs, to note a few.

These fragmented and sprawling webs of digital identities may be coordinated, integrated, and controlled by an identity management system that involves identity federation. Identity federation describes the technical architecture and unique portability of a user's digital identity across independent security domains and autonomous networks. The primary function of identity federation is the allowance of a user of one security domain and/or autonomous network to seamlessly and securely engage another security domain and/or autonomous network without user-administrative encumbrances and redundancy. In this federated construct, an identity provider (e.g., Active Directory®) asserts authentication protocols and houses identity information related to an enterprise's users. When a user tries to complete a particular task that engages one of the enterprise's one or more service providers, that service provider will receive a particular set of identity information from the identity provider as it relates to the user in question. The service provider will then check and consume the data to confirm both authorization of the user and availability of the user's intended application. Collectively, this enables the portability and interoperability of identity information across otherwise tenuous boundaries of security domains.

Though nimble in design, there may be notable shortcomings of current federated identity architecture, primarily in the inability of a user identity that is defined in an enterprise identity provider to be used in more than one sovereign cloud services network (i.e., national or regional cloud services network). For example, an enterprise with users that utilize cloud services in one cloud services network may want its users to access services offered in another cloud services network. In doing so, this enterprise may also seek to use the same user identity defined in its on-premise enterprise identity provider for its users. However, enterprises wanting to access another sovereign cloud services network with the same set of on-premise user identity information (e.g., username and password) must first complete a cloud tenant setup with the other sovereign cloud in question, whereby its unique domain name is registered and validated. With this is mind, current cloud-based identity providers (e.g., Azure® Active Directory®) may not accept the same domain name that is already registered with another cloud-based identity provider in another cloud services network. This makes using the same user identification information near impossible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to the registration of the same domain with different cloud services networks. For example, systems and methods described herein enable registering a domain in a cloud services network wherein the same domain is also concurrently registered in another cloud services network. Systems and methods described herein further enable selecting one of multiple cloud-based identity providers to process a request to authenticate a user associated with a domain that is registered in more than one cloud services network and generating an authentication response in accordance with the selection. Systems and methods described herein also enable the federation of user authentication requests from different cloud services networks to the same enterprise identity provider.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Management of Enterprise Identifiers in Sovereign Cloud Services Networks Secure digital identity has emerged as the most frequent and vital 'traveler' along the enterprise technology thoroughfare that connects more users to more networks on more devices in more places than ever thought possible. Given this robust computing roadway along which all digital identities must journey, the need for fortified and agile identification management systems is paramount. These necessary identification management systems must work tirelessly to mitigate security breaches, avoid slowing down essential network and cloud functionality, and prevent the occurrence of system failure and user error. However, these daunting missions are all the more complicated by the sheer volume of cross-network tasks executed by an enterprise's sphere of users every day. For example, that sphere may include the digital identities of employees, contractors, clients, customers, vendors, suppliers, trading partners, sister company employees, acquisition and merger parties, investors, and any other affiliate entity. All of these digital identities must then be authenticated to be allowed access to a countless variety of databases, content repositories, proprietary files, software as a service (SaaS) sites, intranets, and third-party industry hubs, to note a few.

These fragmented and sprawling webs of digital identities may be coordinated, integrated, and controlled by an identity management system that involves identity federation. Identity federation describes the technical architecture and unique portability of a user's digital identity across independent security domains and autonomous networks. The primary function of identity federation is the allowance of a user of one security domain and/or autonomous network to seamlessly and securely engage another security domain and/or autonomous network without user-administrative encumbrances and redundancy. In this federated construct, an identity provider (e.g., Active Directory®) asserts authentication protocols and houses identity information related to an enterprise's users. When a user tries to complete a particular task that engages one of the enterprise's one or more service providers, that service provider will receive a particular set of identity information from the identity provider as it relates to the user in question. The service provider will then check and consume the data to confirm both authorization of the user and availability of the user's intended application. Collectively, this enables the portability and interoperability of identity information across otherwise tenuous boundaries of security domains.

Though nimble in design, there may be notable shortcomings of current federated identity architecture, primarily in the inability of a user identity that is defined in an enterprise identity provider to be used in more than one sovereign cloud services network (i.e., national or regional cloud services network). For example, an enterprise with users that utilize cloud services in one cloud services network may want its users to access services offered in another cloud services network. In doing so, this enterprise may also seek to use the same user identity defined in its on-premise enterprise identity provider for its users. However, enterprises wanting to access another sovereign cloud services network with the same set of on-premise user identity information (e.g., username and password) must first complete a cloud tenant setup with the other sovereign cloud in question, whereby its unique domain name is registered and validated. With this in mind, current cloud-based identity providers (e.g., Azure® Active Directory®) may not accept the same domain name that is already registered with another cloud-based identity provider in another cloud services network. This makes using the same user identification information near impossible.

An improved technique is needed to allow the use of the same user identity in more than one sovereign cloud services network that can accomplish the already established tenets of identity federation: 1) eliminate security loopholes, 2) reduce user inconveniences like password fatigue, 3) minimize repeated provisioning that often plagues rigid application architectures, 4) improve collaboration and service among partners, customers, and other affiliates, and 5) ultimately decrease costs that result from unnecessary integrations, detrimental identity silos, and vulnerable cross-boundary interactions. However, it must provide additional features that are currently absent from existing identity management system setups: 1) relax the constraint of domain uniqueness across different clouds, 2) introduce a new process for secure registration of the same domain across different clouds, and 3) ensure the ability to control cloud-based identity provider behavior regarding cloud redirections for the same domain across different cloud services networks. Important to note, this improved method should also be scalable as to accommodate the network and computing needs of enterprise businesses with a specific agility in business-to-business functions and task.

Figure 1:
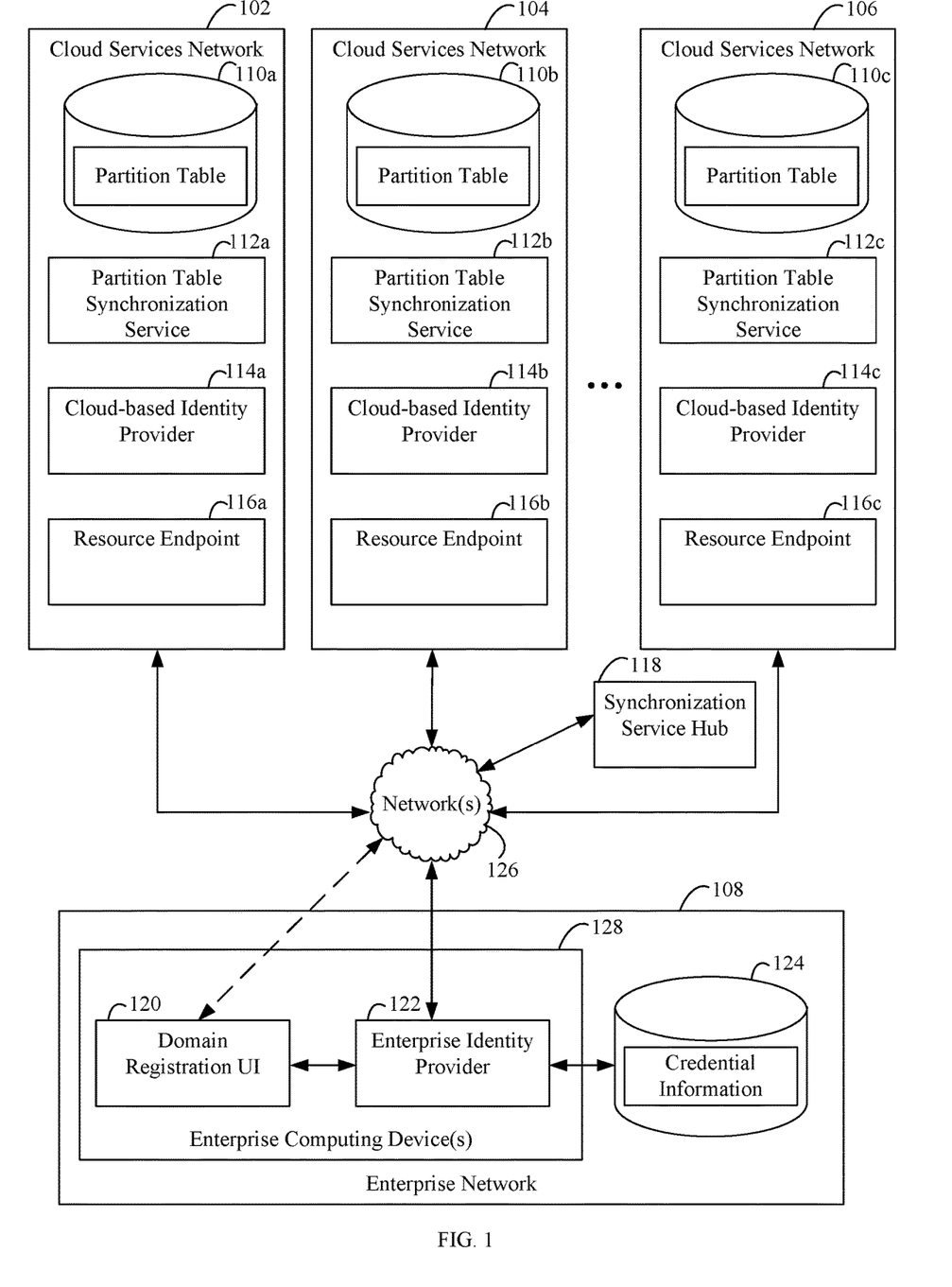
FIG. 1 depicts a block diagram of a system for registering a same domain with different cloud services networks, in accordance with an embodiment.

To help illustrate this, FIG. 1 will now be described. In particular, FIG. 1 is a block diagram of an example system 100 that enables the registration of a domain in more than one sovereign cloud services network. As shown in FIG. 1, example system 100 includes a cloud services network 102, a cloud services network 104, a cloud services network 106, an enterprise network 108, and a synchronization service hub 118. Cloud services networks 102, 104, and 106 each include a data store (e.g., 110a, 110b, 110c), storing a partition table, a partition table synchronization service (e.g., 112a, 112b, 112c), a cloud-based identity provider (e.g., 114a, 114b, 114c), and a resource endpoint (e.g., 116a, 116b, 116c). Enterprise network 108 may include a domain registration user interface (UI) 120, an enterprise identity provider 122, a data store 124 that stores user credentials (e.g., usernames and passwords), and enterprise computing device(s) 128. Although system 100 of FIG. 1 is shown to include three cloud services networks, it is to be understood that the techniques described herein may apply to systems that include more than three cloud services networks.

Each of cloud services networks 102, 104, and 106 may host resources such as cloud applications, services and platforms. A cloud application or service may be of any type of web accessible application/service, such as database application, social networking application, messaging application, financial services application, news application, search application, web-accessible productivity application, cloud storage and/file hosting application, etc. Enterprise network 108 may serve as the communications backbone that connects an organization or company's computing devices at different locations.

Data stores 110a, 110b, and 110c may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The partition tables stored in the data stores may comprise a data structure that identifies one or more cloud services networks with which a domain is registered and that stores metadata associated with the domain for each such cloud services network. Resource endpoints 116a, 116b, and 116c may serve as a login endpoint for a resource, which as noted above may comprise, for example, an application, a service, or a platform. Cloud-based identity providers 114a, 114b, 114c and enterprise identity provider 122 may create, maintain, and manage identity information associated with users while providing authentication services to relying applications and/or services.

Cloud services networks 102, 104, and 106, enterprise network 108, and synchronization service hub 118 may be communicatively connected via one or more networks 126. Network(s) 126 may include, for example, a local area network (LAN), a wide area network (WAN), a personal area network (PAN), and/or a combination of communication networks, such as the Internet. Cloud services networks 102, 104, and 106, enterprise network 108, and synchronization service hub 118 may each include one or more wired and/or wireless network interfaces that enables communications over network(s) 126. Examples of such network interfaces include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Partition table synchronization service 112a may be configured to synchronize partition table 110a stored in data store 110a with other partition tables (e.g., 112b and 112c) maintained by other cloud services networks (e.g., 104 and 106) and synchronization service hub 118. For example, using a hub-spoke synchronization topology, partition table synchronization services 112a, 112b, and 112c (i.e., the spokes of the topology) each synchronize their respective partition tables with a partition table (not shown in FIG. 1) of synchronization service hub 118 and synchronization service hub 118 (i.e., the hub of the topology) synchronizes its partition table with all partition tables of synchronization services 112a, 112b, and 112c. In an embodiment, synchronization service hub 118 may be within a public cloud and partition table synchronization services 112a, 112b, and 112c may be within national clouds (i.e., physical and logical network-isolated instances of cloud services which are confined within the geographic borders of specific countries), although this is only an example.

Cloud-based identity provider 114a may be configured to register a domain in a sovereign cloud services network that is also concurrently registered in another sovereign cloud services network. A domain may be identified by a domain name. Such domain name may consist, for example, of a unique name that appears after an @ sign in email addresses and after www. in web addresses. A domain name may take the form of a name of an organization and a standard Internet suffix (e.g., yourbusiness.com or university.edu). An example technique by which such dual registration may be carried out will now be described.

In accordance with this example, assume that an administrator of a tenant of cloud services network 102 (referred to herein as "administrator 2" and "tenant 2" respectively) would like to register a domain with cloud services network 102, wherein the same domain was already registered with cloud services network 104 by a tenant thereof (referred to herein as "tenant 1"). Administrator 2 first sends a request to register the domain to cloud-based identity provider 114a via domain registration UI 120. If the domain was previously registered, cloud-based identity provider 114a instructs administrator 2 to obtain a verification code for the domain from an administrator of the tenant of cloud services network that the domain was already registered with. In accordance with the technique, administrator 2 must ask an administrator of the tenant of cloud services network 104 (referred to herein as "administrator 1") to provide her with the verification code for the domain.

In response to this request, administrator 1 interacts with cloud-based identity provider 114b to cause cloud-based identity provider 114b to generate a verification code for the domain. Such verification code may be, for example, a randomly-generated numeric or alphanumeric code. Such verification code is automatically or manually stored as part of a context record for the domain within the partition table stored in data store 110b. Then, by virtue of the aforementioned partition table synchronization process, the verification code is updated to the partition table stored in data store 110a.

Administrator 1 then provides administrator 2 with the verification code. Such information may be conveyed face-to-face or via a suitable electronic communication medium (e.g., telephone call, email, text message, or the like). This step advantageously ensures that administrator 1 knows about and consents to the dual registration. Note that there may be scenarios in which administrator 1 and administrator 2 are the same person. In this case, the verification code need not be conveyed in the manner described above.

Administrator 2 then interacts with domain registration UI 120 to initiate a process for registering the domain with cloud services network 102. Domain registration UI 120 may comprise, for example a graphical UI (GUI), a command line UI, a programmatic UI, or the like. Administrator 2 provides the verification code via domain registration UI 120 as an input to the process. The registration process may be carried out, for example, by cloud-based identity provider 114a, or by some other automated entity within cloud services network 102. For the purposes of this description, it will be assumed that cloud-based identity provider 114a implements the registration process.

As part of this registration process, cloud-based identity provider 114a checks partition table 110a (which has been synched with partition table 110b) to determine if the domain has already been registered with cloud services network 102. If it has, the process fails. If not, cloud-based identity provider checks to determine if the domain has already been registered with either of cloud services networks 104 or 106. If it has, then cloud-based identity provider 114a analyzes the context record for that particular domain and cloud services network to obtain a verification code therefrom. In this example, cloud-based identity provider 114a determines that the domain is registered with cloud services network 104 and thus obtains the verification code that is stored in the context record for that domain and cloud services network 104. Cloud-based identity provider 114a then compares the verification code it obtained from the context record to the verification code that was provided by administrator 2 as an input to the registration process. If they do not match, then the process fails. If they do match, then cloud-based identity provider 114a registers the domain with cloud services network 102. Such registration includes updating the partition table stored in data store 110a to associate the domain with cloud services network 102. Cloud-based identity providers 114b and 114c may also be similarly configured to register a domain that is concurrently registered in another sovereign cloud, in cloud services networks 104 and 106, respectively.

Figure 2:
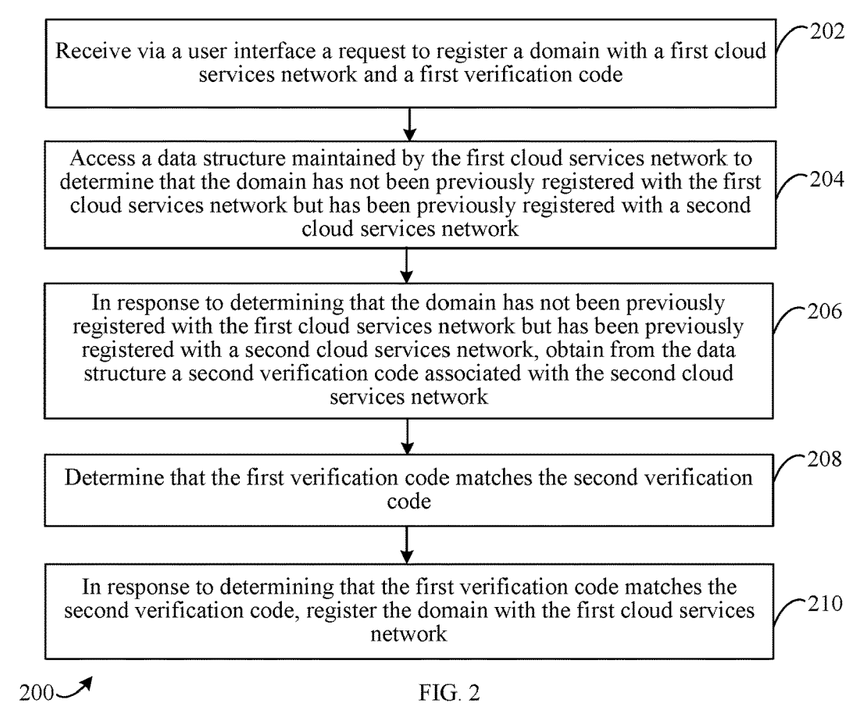
FIG. 2 depicts a flowchart of a method for registering a domain using a verification code with a sovereign cloud services network wherein the domain is concurrently registered with another sovereign cloud services network, in accordance with an embodiment.

To further illustrate this approach, FIG. 2 depicts a flowchart 200 of a method for registering a domain in a sovereign cloud services network wherein the domain is concurrently registered in another sovereign cloud services network, according to an example embodiment. FIG. 2 will be described with continued reference to FIG. 1. However, other structural and operational embodiments will be apparent to persons skilled in the relevant art(s) based on the following discussion regarding flowchart 200.

As shown in FIG. 2, the method of flowchart 200 begins at step 202. In step 202, a request to register a domain with a first cloud services network and a first verification code is received via a user interface. For example, and with continued reference to FIG. 1, cloud-based identity provider 114a may receive a request from a user of enterprise network 108 (e.g., an administrator of a tenant on cloud services network 102) to register a domain with cloud services network 102 through domain registration UI 120. The user may also provide the first verification code along with the request. The first verification code may have been provided to the user by an administrator of a tenant of cloud services network 104 with which the domain was previously registered, as was discussed above.

At step 204 in flowchart 200, a data structure maintained by the first cloud services network is accessed to determine that the domain has not been previously registered with the first cloud network but has been previously registered with a second cloud services network. For example, and with continued reference to FIG. 1, cloud-based identity provider 114a may access a partition table stored in data store 110a to determine that the domain is not currently registered with cloud services network 102 but has been previously registered with another cloud services network (e.g., cloud services network 104).

At step 206 in flowchart 200, in response to determining that the domain has not been previously registered with the first cloud services network but has been previously registered with the second cloud services network, a second verification code associated with the second cloud services network is obtained from the data structure. As discussed above, the administrator of the tenant of cloud services network 104 may have caused the verification code to be stored as part of a context record for the domain within the partition table stored in data store 110b. Then, by virtue of the aforementioned partition table synchronization process, the verification code is updated to the partition table stored in data store 110a. In step 206, this verification code is obtained from the partition table stored in data store 110a.

At step 208 in flowchart 200, the first verification code is determined to match the second verification code. For example, with continued reference to FIG. 1, cloud-based identity provider 114a may determine that the verification code provided by the user via domain registration UI 120 matches the verification code obtained from the partition table stored in data store 110a.

At step 210 in flowchart 200, in response to determining that the first verification code matches the second verification code, the domain is registered with the first cloud services provider. For example, and with continued reference to FIG. 1, cloud-based identity provider 114a may register the domain with the cloud services network 102 after determining that the first verification code matches the second verification code by updating the partition table stored in data store 110a to associate the domain with cloud services network 102.

Figure 3:
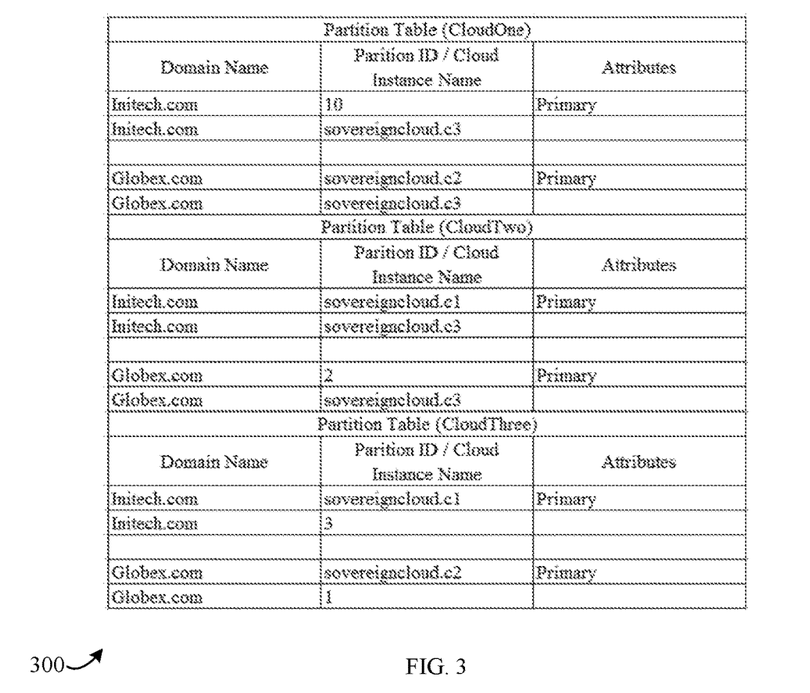
FIG. 3 depicts example partition tables for different sovereign cloud services networks, in accordance with an embodiment.

To help further illustrate the foregoing, FIG. 3 depicts example partition tables 300 for sovereign cloud services networks, according to an example embodiment. As shown in FIG. 3, each partition table identifies a plurality of cloud services networks (e.g., "CloudOne", "CloudTwo", "CloudThree") with which a domain (e.g., "Initech.com", "Globex.com") is registered and stores metadata associated with the domain for each cloud services network in the plurality of cloud services networks.

The metadata provided in partition tables 300 includes "Partition ID" or "Cloud Instance Name" and "Attributes" associated with a particular domain. Partition ID identifies a partition (e.g., a subset of computing resources within a cloud services network) at which data associated with the domain may be accessed locally within a cloud services network. Cloud Instance Name indicates a name of another cloud services network that the domain is registered with and which may be used for redirecting authentication requests as will be discussed in more detail herein. For instance, in the first row of the partition table for the CloudOne cloud services network, Initech.com has a Partition ID of "10", which is an identifier of a partition of the CloudOne cloud services network in which data associated with Initech.com may be found. As another example, in the second entry of the partition table for the CloudOne cloud services network, Initech.com has a Cloud Instance Name of "sovereigncloud.c3", which indicates that Initech.com is also registered in the CloudThree cloud services network.

When a domain is registered for the first time, the domain is entered in the partition table for the cloud services network with which it is being registered. If there is no other entry in the partition table for this domain, an entry is added to the partition table including the name of the domain and the Partition ID associated with the domain. The new entry may also indicate whether the cloud services network is the "primary" or default cloud services network for the domain. In embodiments, the first cloud services network a domain is registered with may be marked as the domain's primary cloud services network and only one cloud services network in a partition table may be marked as primary for any domain.

When a domain is registered a second time in another sovereign cloud services network (e.g., in accordance with the methods described above), then the registration is added to a new entry in the partition table of the other sovereign cloud services network, the Partition ID is updated to reflect the location of the data within the other sovereign cloud services network, and the Attribute field is left empty, as the first domain registration was marked as primary. A domain, however, cannot be registered twice in the same cloud services network.

As described above, when a partition table is updated, that new entry is replicated to other partition tables stored in other cloud services networks by virtue of a partition table synchronization process. For example, when an entry is added to a partition table when registering a domain in a cloud services network, other partition tables are updated with entries including the name of the domain and the name of the cloud services network that the cloud services network is being registered in. If the cloud services network is marked as the primary cloud services network for the domain in the partition table, then the other partition tables are updated to reflect the cloud services network as primary. For example, the fields of the first entry of the partition table for the CloudOne cloud services network indicate that Initech.com has a Partition ID of 10 and that the CloudOne cloud services network is its primary cloud services network. The fields of the first entry of the partition table for the CloudThree cloud services network indicate that Initech.com is associated with a Cloud Instance Name of sovereigncloud.c1, which is also marked as primary.

When a domain is registered with multiple cloud services networks in the manner described above, the Partition ID, Cloud Instance Name and Attributes data stored in association with that domain in each partition table may advantageously be used to determine which of multiple cloud services network should handle authentication requests for users associated with that domain. That is to say, system 100 of FIG. 1 enables the selection of one of a plurality of cloud-based identity providers, each of which is associated with a different sovereign cloud services network, to process a request to authenticate a user associated with a domain that is registered in more than one sovereign cloud services network.

This feature of system 100 will now be further described in reference to FIG. 4, which itself will be described with continued reference to FIG. 1 and FIG. 3. However, other structural and operational embodiments will be apparent to persons skilled in the relevant art(s) based on the following discussion regarding flowchart 400.

The following description of flowchart 400 refers to a first cloud services network and a second cloud services network. In the associated examples that refer to FIGS. 1 and 3, it will be assumed that the first cloud services network is cloud services network 102 and the second cloud services network is cloud services network 104.

Figure 4:
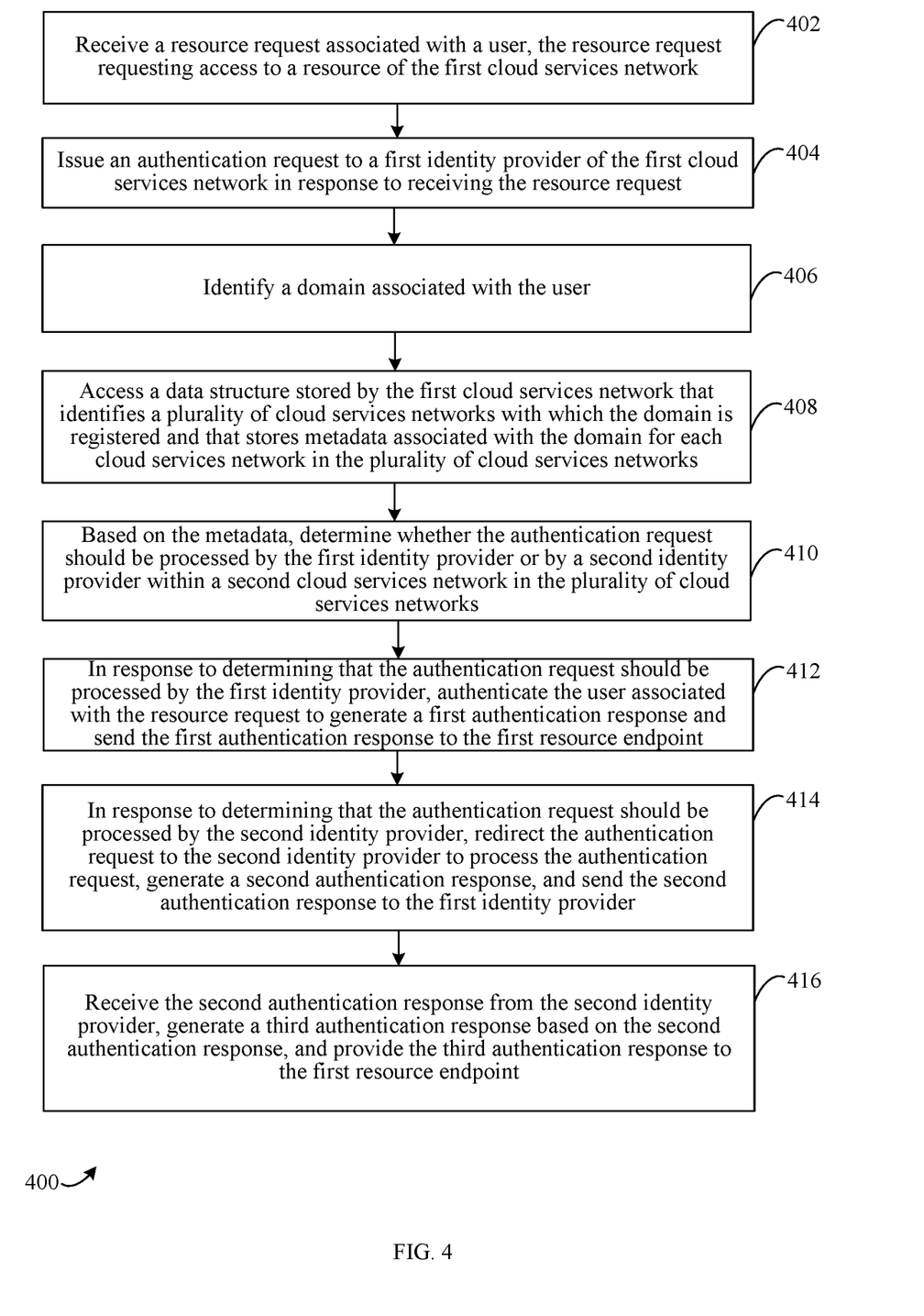
FIG. 4 depicts a flowchart of a method for selecting one of a plurality of cloud-based identity providers to process a request to authenticate a user associated with a domain that is registered in more than one cloud services network and generating an authentication response in accordance with the selection, in accordance with an example embodiment.

As shown in FIG. 4, the method of flowchart 400 begins at step 402. In step 402, a resource request associated with a user is received. The resource request requests access to a resource of a first cloud services network. For example, resource endpoint 116a may receive a resource request via network(s) 126. The resource request may request access to a resource of cloud services network 102 on behalf of a user. In some scenarios, the resource request may originate from a user's web browser, although this is only an example.

At step 404 in flowchart 400, in response to receiving the resource request, an authentication request is issued to a first identity provider of the first cloud services network. For example, in response to receiving the resource request, resource endpoint 116a may issue an authentication request to cloud-based identity provider 114a of cloud services network 102. In an embodiment, resource endpoint 116a may issue the authentication request to identity provider 114a in response to determining that an access token was not provided with the resource request.

At step 406 in flowchart 400, a domain associated with the user is identified. For example, upon receiving the authentication request from resource endpoint 116a, cloud-based identity provider 114a may identify a domain associated with the user. Cloud-based identity provider 114a may do this, for example, based on a domain name portion of a user name included in or otherwise associated with the authentication request, although this is only an example. As noted above, a domain name may take the form of a name of an organization and a standard Internet suffix (e.g., Initech.com, Globex.com).

At step 408 in flowchart 400, a data structure that is stored by the first cloud services network is accessed. The data structure identifies a plurality of cloud services networks with which the domain is associated. The data structure also stores metadata associated with the domain for each cloud services network in the plurality of cloud services networks. For example, cloud-based identity provider 114a may access the partition table stored in data store 110a to retrieve metadata associated with the domain that was identified in step 406. For example, assume for the sake of illustration that cloud services network 102 is the CloudOne cloud services network referenced in FIG. 3 and that the domain is Initech.com. In this case, cloud-based identity provider 114a accesses the partition table for the CloudOne resource cloud network. As shown in FIG. 3, this partition table indicates that Initech.com is registered in both the CloudOne cloud services network and the CloudThree cloud services network. Furthermore, the metadata indicates that the CloudOne cloud services network is the primary cloud services network for Initech.com and that partition 10 holds the data associated with it.

At step 410 in flowchart 400, it is determined based on the metadata whether the authentication request should be processed by the first identity provider or by a second identity provider within a second cloud services network in the plurality of cloud services networks. With continued reference to FIG. 1 and FIG. 3, assume for the sake of illustration that cloud services network 102 is the CloudOne cloud services network referenced in FIG. 3, cloud services network 104 is the CloudThree cloud services network referenced in FIG. 3, and the domain is Initech.com. Cloud-based identity provider 114a (of CloudOne cloud services network) may determine whether it or cloud-based identity provider 114b (of CloudThree cloud services network) should process the authentication request based on the metadata stored in association with the Initech.com in the CloudOne cloud services network partition table. In this example, cloud-based identity provider 114a would determine that it should process the authentication request itself because the metadata associated with Initech.com indicates that the data associated with enterprise Initech is locally available in the CloudOne cloud services network. Note that if a cloud services network receives an authentication request associated with a domain and data associated with the domain is locally available in the cloud services network, the cloud services network will process the authentication request even if another cloud services network is indicated as a primary cloud services network for the domain.

At step 412 in flowchart 400, in response to determining that the authentication request should be processed by the first identity provider, the first identity provider authenticates the user associated with the resource request to generate a first authentication response and the first authentication response is sent to the first resource endpoint. In the example described above, and with continued reference to FIG. 1 and FIG. 3, cloud-based identity provider 114a would authenticate the user associated with the resource request and send an authentication response to resource endpoint 116a. Such authentication response may include, for example, an access token that can then be used by resource endpoint 116a to determine if the user should be provided with access to the resource.

In embodiments, resource endpoint 116a may grant or deny access to the resource of cloud services network 102 based on one or more claims included in such an access token. The one or more claims may include a statement that one subject, such as a company or organization, makes about itself or another subject. For example, the statement can be about a name, group, buying preference, ethnicity, privilege, association or capability. However, these are examples only and are not intended to be limiting.

At step 414 in flowchart 400, in response to determining that the authentication request should be processed by the second identity provider, the authentication request is redirected to the second identity provider which then processes the authentication request, generates a second authentication response, and sends it to the first resource endpoint. To illustrate this outcome, assume for the sake of illustration that cloud services network 102 is the CloudOne cloud services network referenced in FIG. 3, that cloud services network 104 is the CloudTwo cloud services network referenced in FIG. 3, and that the domain is Globex.com. After receiving an authentication request associated with the domain Globex.com, cloud-based identity provider 114a (of CloudOne cloud services network) may determine whether it or cloud-based identity provider 114b (of CloudTwo cloud services network) should process the authentication request based on the metadata associated with Globex.com in the CloudOne cloud services network partition table.

In this example, cloud-based identity provider 114b would be selected to process the authentication request because as shown in FIG. 3 the metadata associated with Globex.com indicates that CloudTwo is the primary cloud services network for Globex.com. Thus, in this example, cloud-based identity provider 114a would redirect the authentication request to cloud-based identity provider 114b based on the Cloud Instance Name of "sovereigncloud.c2" and cloud-based identity provider 114b would process the authentication request, generate a second authentication response, and send the second authentication response to cloud-based identity provider 114a. Such authentication response may include, for example, user credentials of the user associated with the resource request.

At step 416 in flowchart 400, the second authentication response is received from the second identity provider, a third authentication response is generated based on the second authentication response, and the third authentication response is provided to the first resource endpoint. For example, continuing with the example described above, cloud-based identity provider 114a receives the second authentication request from identity provider 114b and generates a third authentication request using the user credentials included in the second authentication request. The third authentication request may include an access token that can then be used by resource endpoint 116a to determine if the user should be provided with access to the resource.

Figure 5:
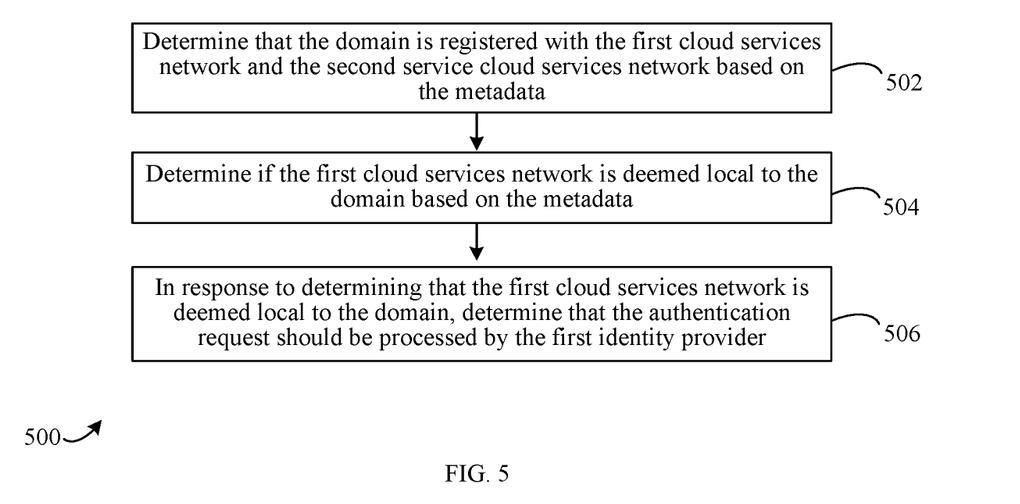
FIG. 5 depicts a flowchart of a first method for determining whether an authentication request should be processed by a first identity provider or by a second identity provider in a system that includes a plurality of cloud services networks, in accordance with an embodiment.

FIG. 5 depicts a flowchart 500 of one manner of performing step 410 of flowchart 400 in FIG. 4. FIG. 5 will be described with continued reference to FIG. 1 and FIG. 3. However, other structural and operational embodiments will be apparent to persons skilled in the relevant art(s) based on the following discussion regarding flowchart 500.

As shown in FIG. 5, the method of flowchart 500 begins at step 502. In step 502, the domain is determined to be registered with the first cloud services network and the second service cloud services network based on the metadata. For example, and with continued reference to FIG. 1 and FIG. 3, cloud-based identity provider 114a may access the partition table stored in data store 110a to retrieve metadata associated with the domain Initech.com. As shown in FIG. 3, such metadata indicates that Initech.com is registered with the CloudOne cloud services network as well as with the CloudThree cloud services network. Thus, cloud-based identity provider 114a determines that the domain Initech.com is registered with the CloudOne cloud services network and the CloudThree cloud services network based on the metadata.

At step 504 in flowchart 500, it is determined that the first cloud services network is deemed local to the domain based on the metadata. For example, assume for the sake of illustration that cloud services network 102 is the CloudOne cloud services network referenced in FIG. 3, cloud services network 104 is the CloudThree cloud services network referenced in FIG. 3, and the domain is Initech.com. In this case, by examining the first entry of the partition table for the CloudOne cloud services network, cloud-based identity provider 114a determines that Initech.com is associated with a Partition ID of "10", which identifies a partition of the CloudOne cloud services network in which data associated with Initech.com may be found. Thus, cloud-based identity provider 114a determines that the domain Initech.com is deemed local to the CloudOne cloud services network. In contrast, in the second entry of the partition table for the CloudOne cloud services network, Initech.com is associated with Cloud Instance Name of "sovereigncloud.c3", which indicates a name of another cloud services network that the Initech.com is registered with. Thus, Initech.com is also registered in another sovereign cloud services network which is not local to the CloudOne cloud services network.

At step 506 in flowchart 500, in response to determining that the first cloud services network is deemed local to the domain, it is determined that the authentication request should be processed by the first identity provider. For example, with continued reference to FIG. 1 and FIG. 3, in response to determining that cloud services network 102 (the CloudOne cloud services network) is deemed local to the domain Initech.com, cloud-based identity provider 114a may determine that it should process the authentication request itself. In other words, if a cloud services network is deemed local to the relevant domain, then a cloud-based identity provider of the cloud services network can process the authentication request and there is no need to redirect the authentication request to another cloud-based identity provider of another cloud services network.

Figure 6:
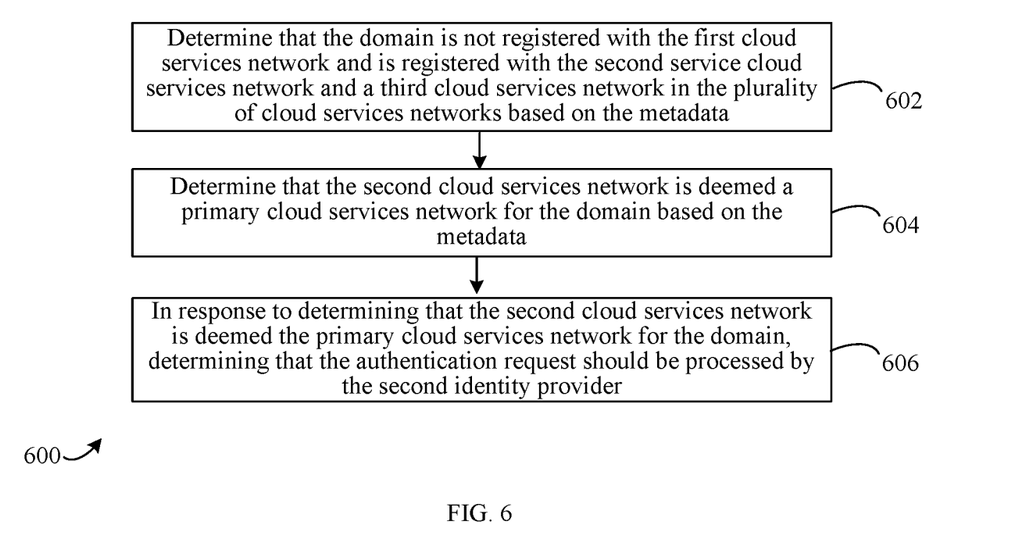
FIG. 6 depicts a flowchart of a second method for determining whether an authentication request should be processed by a first identity provider or a second identity provider in a system that includes a plurality of cloud services networks, in accordance with an embodiment.

FIG. 6 depicts a flowchart 600 of another manner of performing step 410 of flowchart 400 in FIG. 4. FIG. 6 will be described with continued reference to FIG. 1 and FIG. 3. However, other structural and operational embodiments will be apparent to persons skilled in the relevant art(s) based on the following discussion regarding flowchart 600.

As shown in FIG. 6, the method of flowchart 600 begins at step 602. In step 602, it is determined that the relevant domain is not registered with the first cloud services network and is instead registered with the second cloud services network and a third cloud services network in the plurality of cloud services networks based on the metadata. For example, and with continued reference to FIG. 1 and FIG. 3, cloud-based identity provider 114a may access the partition table stored in data store 110a to retrieve metadata associated with the domain Globex.com. As shown in FIG. 3, such metadata indicates that Globex.com is not registered with the CloudOne cloud services network (as there is no entry in the partition table associating Globex.com with the CloudOne cloud services network), but is registered with the CloudTwo cloud services network and the CloudThree cloud services network. Thus, cloud-based identity provider 114a determines that the domain Initech.com is not registered with the CloudOne cloud services network but is registered with the CloudTwo and CloudThree cloud services networks based on the metadata.

At step 604 in flowchart 600, it is determined that the second cloud services network is deemed a primary cloud services network for the domain based on the metadata. Continuing with the foregoing example in which the relevant domain is Globex.com, the second cloud services network is the CloudTwo cloud services network, and the third cloud services network is the CloudThree cloud services network, based on the metadata, cloud-based identity provider 114a may determine that the CloudTwo cloud services network is deemed the primary cloud services network for the domain Globex.com. This is because, in the partition table of the CloudOne cloud services network, the entry for Globex.com/sovereigncloud.c2 is marked as "Primary." As such, the CloudTwo cloud services network is the cloud services network to which resource requests associated with Globex.com should be redirected when sent to a cloud services network with which Globex.com is not registered.

At step 606 in flowchart 600, in response to determining that the second cloud services network is deemed the primary cloud services network for the domain, it is determined that the authentication request should be processed by the second identity provider. For example, with continued reference to FIG. 1 and FIG. 3, in response to determining that cloud services network 104 (in this scenario, corresponding to the CloudTwo cloud services network) is deemed the primary cloud services network for Globex.com, cloud-based identity provider 114a determines that the authentication request should be processed by cloud-based identity provider 114b. In embodiments, cloud-based identity provider 114a redirects the authentication request to cloud-based identity provider 114b to process the authentication request, generate a second authentication response, and send the second authentication response to resource endpoint 116a.

Based on the dual registration features described above, system 100 further enables the processing of user authentication requests from different sovereign cloud services networks to be federated to the same enterprise identity provider. The enterprise identity provider can then process the different user authentication requests using the same credential information. With continued reference to FIG. 1, enterprise identity provider 122 may be configured to receive a user authentication request from a first cloud-based identity provider within a first cloud services network and process the user authentication request based on credential information associated with the user and stored by enterprise identity provider 122 and receive another user authentication request from a second cloud-based identity provider within a second cloud services network and process the other user authentication request based on the same credential information associated with the user.

For example, a user may request access to a resource within cloud services network 102, connecting through an address (e.g., Uniform Resource Locator (URL)) to resource endpoint 116a. Resource endpoint 116a may then request an access token for the resource from cloud-based identity provider 114a. Based on the domain associated with the user, cloud-based identity provider 114a may determine that user authentication should be federated to enterprise identity provider 122 of enterprise network 108 and request enterprise identity provider 122 to authenticate the user. Enterprise identity provider 122 may authenticate the user using credential information (e.g., user name and password) stored at data store 124 and provide a federated token to cloud-based identity provider 114a. Cloud-based identity provider 114a may then use the federated token to generate an access token to be provided to resource endpoint 116a.

Following the same process described above, the same user may request access to a resource within cloud services network 104, connecting through an address to resource endpoint 116*b*. Resource endpoint 116*b* may then request an access token for the resource from cloud-based identity provider 114*b*. Based on the domain associated with the user, cloud-based identity provider 114*b* may also determine that user authentication should be federated to enterprise identity provider 122 of enterprise network 108 and request enterprise identity provider 122 to authenticate the user. Enterprise identity provider 122 may then use the same credential information stored at data store 124 to authenticate the user and provide a federated token to cloud-based identity provider 114*b*. Cloud-based identity provider 114*b* may then use the federated token to generate an access token to be provided to resource endpoint 116*b*. Similarly, if cloud-based identity provider 114*c* of cloud services network 106 is federated with enterprise identity provider 122 of enterprise network 108, then enterprise identity provider 122 may authenticate the user with the same credential information used to access the resources in cloud services networks 102 and 104 when the user requests access to resources within cloud services network 106.

Figure 7:
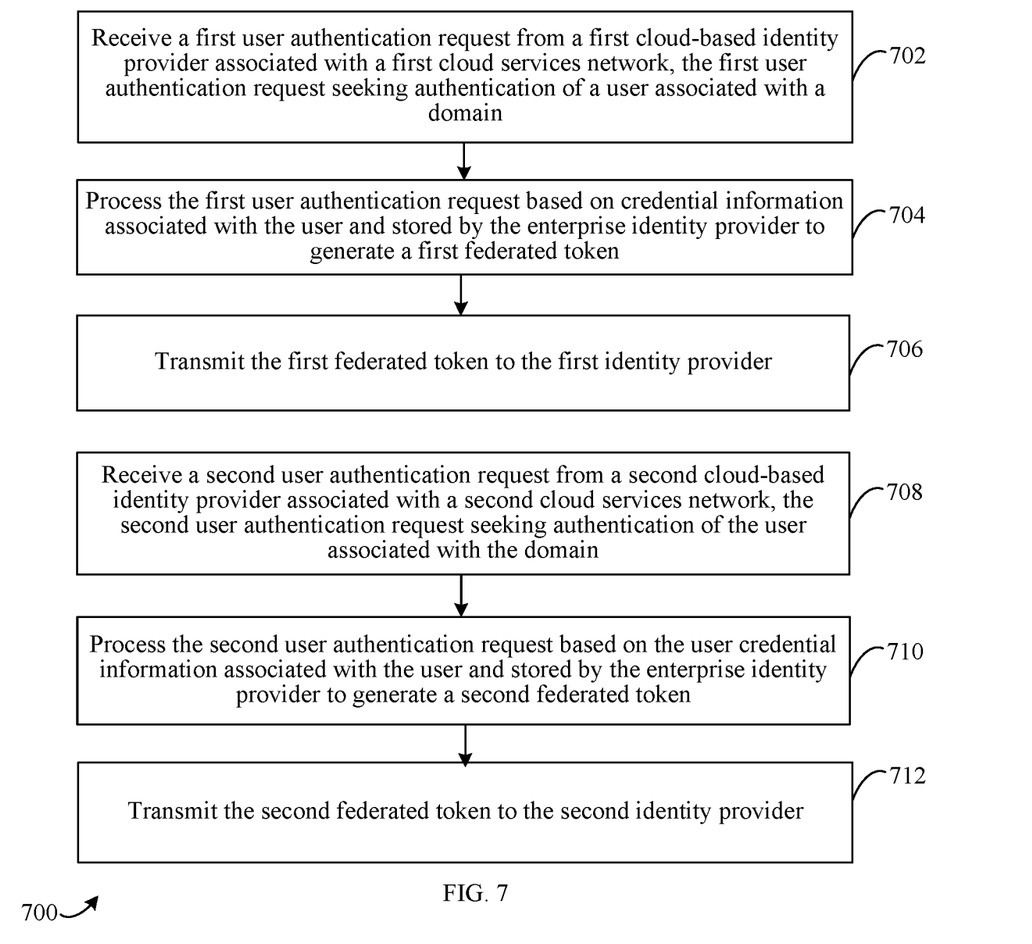
FIG. 7 depicts a flowchart of a method for federating user authentication requests from different users associated with a domain and from different sovereign cloud services networks with which the domain is registered to the same enterprise identity provider, in accordance with an embodiment.

To further illustrate this feature, FIG. 7 depicts a flowchart 700 of a method for federating user authentication requests from different users associated with a domain and from different sovereign cloud services networks with which the domain is registered to the same enterprise identity provider, in accordance with an embodiment. FIG. 7 will be described with continued reference to FIG. 1. However, other structural and operational embodiments will be apparent to persons skilled in the relevant art(s) based on the following discussion regarding flowchart 700.

As shown in FIG. 7, the method of flowchart 700 begins at step 702. In step 702, a first user authentication request is received from a first cloud-based identity provider associated with a first cloud services network, the first user authentication request seeking authentication of a user associated with a domain. For example, with continued reference to FIG. 1, enterprise identity provider 122 may receive a user authentication request from cloud-based identity provider 114*a* in cloud services network 102. The user to be authenticated may be a user requesting access to a resource within cloud services network 102, for example, by connecting through an address (e.g., Uniform Resource Locator (URL)) to resource endpoint 116*a*. The user may be associated with a domain of the enterprise.

In step 704, the first user authentication request is processed based on credential information associated with the user and stored by the enterprise identity provider to generate a first federated token. For example, enterprise identity provider 122 may authenticate the user using credential information (e.g., username and password) stored at data store 124 to generate a first federated token.

In step 706, the first federated token is transmitted to the first identity provider. For example, with continued reference to FIG. 1, after authenticating the user, enterprise identity provider 122 may provide the first federated token to cloud-based identity provider 114*a*. The first federated token may be useable by cloud-based identity provider 114*a* to generate a respective access token that is useable to determine whether the user is permitted access to a resource associated via resource endpoint 116*a*. In embodiments, the second federated token may include one or more claims about the user. Resource endpoint 116*b* may grant or deny access to the resource of cloud services network 104 based on one or more of claims about the user included in the federated token.

In step 708, a second user authentication request is received from a second cloud-based identity provider associated with a second cloud services network, the second user authentication request seeking authentication of the same user associated with the same domain. For example, with continued reference to FIG. 1, enterprise identity provider 122 may receive a user authentication request from cloud-based identity provider 114*b* in cloud services network 104. The user to be authenticated may be the same user requesting access to a resource within cloud services network 104, for example, by connecting through an address (e.g., Uniform Resource Locator (URL)) to resource endpoint 116*b*.

In step 710, the second user authentication request is processed based on the user credential information associated with the user and stored by the enterprise identity provider to generate a second federated token. For example, enterprise identity provider 122 may authenticate the user using credential information (e.g., username and password) stored at state store 124 to generate a second federated token.

In step 712, the second federated token is transmitted to the second identity provider. For example, with continued reference to FIG. 1, enterprise identity provider 122 may provide the second federated token to cloud-based identity provider 114*b*. The second federated token may be useable by cloud-based identity provider 114*b* to generate a respective access token that is useable to determine whether the user is permitted access to a resource associated with resource endpoint 116*b*. In embodiments, the second federated token may include one or more claims about the user. Resource endpoint 116*b* may grant or deny access to the resource of cloud services network 104 based on one or more of claims about the user included in the federated token.

III. Example Computer System Implementation

Figure 8:
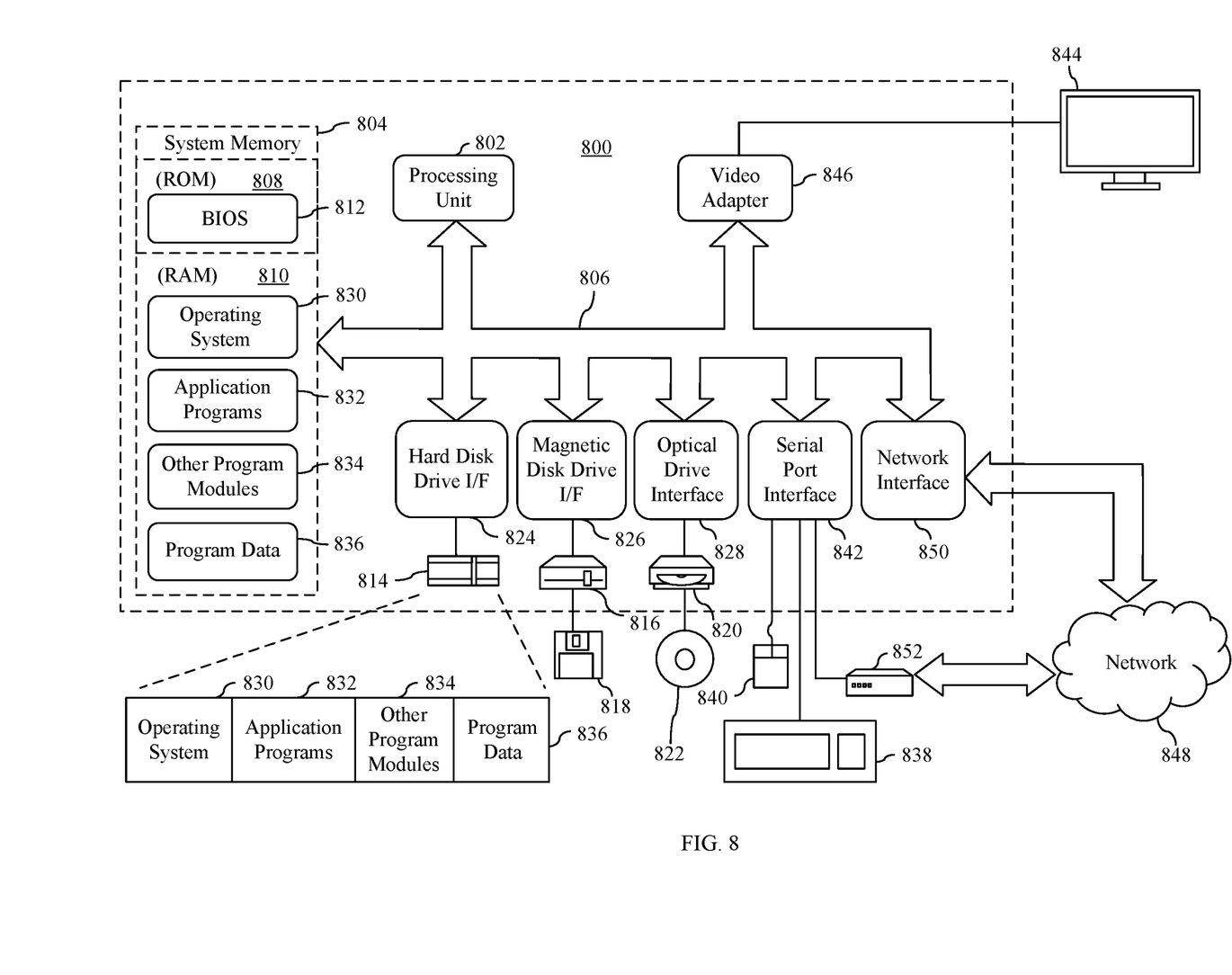
FIG. 8 is a block diagram of an example computing device that may be used to implement embodiments.

FIG. 8 depicts an example processor-based computer system 800 that may be used to implement various embodiments described herein, such as any of the embodiments described in the Sections above and in reference to FIGS. 1-7. For example, processor-based computer system 800 may be used to implement any of the components of system 100 as described above in reference to FIGS. 1 and 3 as well as any of the flowcharts described above in reference to FIGS. 2 and 4-7. The description of system 800 provided herein is provided for purposes of illustration and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the embodiments described in reference to FIGS. 1-7.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

In an embodiment a system includes: a first cloud services network including: a first plurality of computing devices; a first resource endpoint implemented on one or more computing devices in the first plurality of computing devices, the first resource endpoint being configured to: receive a resource request associated with a user, the resource request requesting access to a resource of the first cloud services network; issue an authentication request to a first identity provider of the first cloud services network in response to receiving the resource request; the first identity provider implemented on one or more computing devices in the first plurality of computing devices, the first identity provider being configured to: identify a domain associated with the user; access a data structure stored by the first cloud services network that identifies a plurality of cloud services networks with which the domain is registered and that stores metadata associated with the domain for each cloud services network in the plurality of cloud services networks; based on the metadata, determine whether the authentication request should be processed by the first identity provider or by a second identity provider within a second cloud services network in the plurality of cloud services networks; in response to determining that the authentication request should be processed by the first identity provider, authenticate the user associated with the resource request to generate a first authentication response and send the first authentication response to the first resource endpoint; in response to determining that the authentication request should be processed by the second identity provider, redirect the authentication request to the second identity provider to process the authentication request, generate a second authentication response and send the second authentication response to the first identity provider; and receive the second authentication response from the second identity provider, generate a third authentication response based on the second authentication response, and provide the third authentication response to the first resource endpoint.

In an embodiment of the foregoing system, the resource comprises one of an application, a service, or a platform.

In an embodiment of the foregoing system, the first resource endpoint is configured to issue the authentication request to the first identity provider further in response to determining that an access token was not provided with the resource request.

In an embodiment of the foregoing system, the first resource endpoint is further configured to grant or deny access to the resource of the first cloud services network based on either the first authentication response or the third authentication response.

In an embodiment of the foregoing system, the first resource endpoint is configured to grant or deny access to the resource of the first cloud services network based on one or more of claims included in an access token that is included in either the first authentication response or the third authentication response.

In an embodiment of the foregoing system, the first identity provider is configured to determine whether the authentication request should be processed by the first identity provider or by the second identity provider within the second cloud services network in the plurality of cloud services networks based on the metadata by: determining that the domain is registered with the first cloud services network and the second service cloud services network based on the metadata; determining if the first cloud services network is deemed local to the domain based on the metadata; in response to determining that the first cloud services network is deemed local to the domain, determine that the authentication request should be processed by the first identity provider.

In an embodiment of the foregoing system, the first identity provider is configured to determine that the authentication request should be processed by the second identity provider within the second cloud services network in the plurality of cloud services networks based on the metadata by: determining that the domain is not registered with the first cloud services network and is registered with the second service cloud services network and a third cloud services network in the plurality of cloud services networks based on the metadata; determining that the second cloud services network is deemed a primary cloud services network for the domain based on the metadata; and in response to determining that the second cloud services network is deemed the primary cloud services network for the domain, determining that the authentication request should be processed by the second identity provider.

In an embodiment of the foregoing system, the first cloud services network and the second cloud services network comprise different sovereign (national or regional) clouds.

In an embodiment of the foregoing system, the first cloud services network is configured to synchronize the data structure with other data structures respectively maintained by other cloud services networks, the other data structures identifying the plurality of cloud services networks with which the domain is registered and storing metadata associated with the domain for each cloud services network in the plurality of cloud services networks.

In an embodiment of the foregoing system, the first identity provider is configured to authenticate the user associated with the resource request to generate the first authentication response by obtaining a first federated token from an enterprise identity provider.

In an embodiment of the foregoing system, the second identity provider is configured to authenticate the user associated with the resource request to generate the second authentication response by obtaining a second federated token from the enterprise identity provider.

In another embodiment, a computer-implemented enterprise identity provider, comprises: one or more processing circuits; one or more memory devices connected to the one or more processing circuits, the one or more memory devices storing computer program instructions that when executed by the one or more processing circuits cause the one or more processing circuits to perform operations, the operations including: receiving a first user authentication request from a first cloud-based identity provider associated with a first cloud services network, the first user authentication request seeking authentication of a user associated with a domain; processing the first user authentication request based on credential information associated with the user and stored by the enterprise identity provider to generate a first federated token; and transmitting the first federated token to the first identity provider; receiving a second user authentication request from a second cloud-based identity provider associated with a second cloud services network, the second user authentication request seeking authentication of the user associated with the domain; processing the second user authentication request based on the user credential information associated with the user and stored by the enterprise identity provider to generate a second federated token; and transmitting the second federated token to the second identity provider.

In an embodiment of the foregoing computer-implemented enterprise entity provider, each of the first federated token and the second federated token includes one or more claims about the user.

In an embodiment of the foregoing computer-implemented enterprise entity provider, each of the first federated token and the second federated token is respectively useable by the first cloud-based identity provider and the second cloud-based identity provider to generate a respective access token that is useable to determine whether the user is permitted access to a respective cloud-based resource.

In an embodiment of the foregoing computer-implemented enterprise entity provider, the first cloud services network and the second cloud services network comprise different sovereign (national or regional) clouds.

In another embodiment, a method comprises: receiving via a user interface a request to register a domain with a first cloud services network and a first verification code; accessing a data structure maintained by the first cloud services network to determine that the domain has not been previously registered with the first cloud services network but has been previously registered with a second cloud services network; in response to determining that the domain has not been previously registered with the first cloud services network but has been previously registered with a second cloud services network, obtaining from the data structure a second verification code associated with the second cloud services network; determining that the first verification code matches the second verification code; and in response to determining that the first verification code matches the second verification code, registering the domain with the first cloud services network.

In an embodiment of the foregoing method, registering the domain with the first cloud services network comprises updating the data structure to indicate that the domain is associated with the first cloud services network and the second cloud services network.

In an embodiment, the foregoing method further comprises: synchronizing the data structure with other data structures maintained by one or more other cloud services networks to indicate in the other data structures that the domain is associated with the first cloud services network and the second cloud services network.

In an embodiment of the foregoing method, the first verification code comprises a randomly-generated numeric or alpha-numeric code.

In an embodiment, the foregoing method further comprises: identifying only one of the first cloud services network and the second cloud services network as primary within the data structure.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system including:
   a first cloud services network including:
      a first plurality of computing devices;
      a first resource endpoint implemented on one or more computing devices in the first plurality of computing devices, the first resource endpoint being configured to:
         receive a resource request associated with a user, the resource request requesting access to a resource of the first cloud services network;
         issue an authentication request to a first identity provider of the first cloud services network in response to receiving the resource request;
      the first identity provider implemented on one or more computing devices in the first plurality of computing devices, the first identity provider being configured to:
         identify a domain associated with the user;
         access a data structure stored by the first cloud services network that identifies a plurality of cloud services networks with which the domain is registered and that stores metadata associated with the domain for each cloud services network in the plurality of cloud services networks;
         based on the metadata, determine whether the authentication request should be processed by the first identity provider or by a second identity provider within a second cloud services network in the plurality of cloud services networks;
         in response to determining that the authentication request should be processed by the first identity provider, authenticate the user associated with the resource request to generate a first authentication response and send the first authentication response to the first resource endpoint;
         in response to determining that the authentication request should be processed by the second identity provider,
            redirect the authentication request to the second identity provider to process the authentication request, generate a second authentication response and send the second authentication response to the first identity provider; and
            receive the second authentication response from the second identity provider, generate a third authentication response based on the second authentication response, and provide the third authentication response to the first resource endpoint.

2. The system of claim 1, wherein the resource comprises one of an application, a service, or a platform.

3. The system of claim 1, wherein the first resource endpoint is configured to issue the authentication request to the first identity provider further in response to determining that an access token was not provided with the resource request.

4. The system of claim 1, wherein the first resource endpoint is further configured to grant or deny access to the resource of the first cloud services network based on either the first authentication response or the third authentication response.

5. The system of claim 4, wherein the first resource endpoint is configured to grant or deny access to the resource of the first cloud services network based on one or more of claims included in an access token that is included in either the first authentication response or the third authentication response.

6. The system of claim 1, wherein the first identity provider is configured to determine whether the authentication request should be processed by the first identity provider or by the second identity provider within the second cloud services network in the plurality of cloud services networks based on the metadata by:
   determining that the domain is registered with the first cloud services network and the second service cloud services network based on the metadata;
   determining if the first cloud services network is deemed local to the domain based on the metadata;
   in response to determining that the first cloud services network is deemed local to the domain, determine that the authentication request should be processed by the first identity provider.

7. The system of claim 1, wherein the first identity provider is configured to determine that the authentication request should be processed by the second identity provider within the second cloud services network in the plurality of cloud services networks based on the metadata by:
   determining that the domain is not registered with the first cloud services network and is registered with the second service cloud services network and a third cloud services network in the plurality of cloud services networks based on the metadata;
   determining that the second cloud services network is deemed a primary cloud services network for the domain based on the metadata; and
   in response to determining that the second cloud services network is deemed the primary cloud services network for the domain, determining that the authentication request should be processed by the second identity provider.

8. The system of claim 1, wherein the first cloud services network and the second cloud services network comprise different sovereign (national or regional) clouds.

9. The system of claim 1, wherein the first cloud services network is configured to synchronize the data structure with other data structures respectively maintained by other cloud services networks, the other data structures identifying the plurality of cloud services networks with which the domain is registered and storing metadata associated with the domain for each cloud services network in the plurality of cloud services networks.

10. The system of claim 1, wherein the first identity provider is configured to authenticate the user associated with the resource request to generate the first authentication response by obtaining a first federated token from an enterprise identity provider.

11. The system of claim 10, wherein the second identity provider is configured to authenticate the user associated with the resource request to generate the second authentication response by obtaining a second federated token from the enterprise identity provider.

12. A computer-implemented enterprise identity provider, comprising:
  one or more processing circuits;
  one or more memory devices connected to the one or more processing circuits, the one or more memory devices storing computer program instructions that when executed by the one or more processing circuits cause the one or more processing circuits to perform operations, the operations including:
    receiving a first user authentication request from a first cloud-based identity provider associated with a first cloud services network, the first user authentication request seeking authentication of a user associated with a domain;
    processing the first user authentication request based on credential information associated with the user and stored by the enterprise identity provider to generate a first federated token; and
    transmitting the first federated token to the first identity provider;
    receiving a second user authentication request from a second cloud-based identity provider associated with a second cloud services network, the second user authentication request seeking authentication of the user associated with the domain;
    processing the second user authentication request based on the user credential information associated with the user and stored by the enterprise identity provider to generate a second federated token; and
    transmitting the second federated token to the second identity provider.

13. The computer-implemented enterprise entity provider of claim 12, wherein each of the first federated token and the second federated token includes one or more claims about the user.

14. The computer-implemented enterprise entity provider of claim 12, wherein each of the first federated token and the second federated token is respectively useable by the first cloud-based identity provider and the second cloud-based identity provider to generate a respective access token that is useable to determine whether the user is permitted access to a respective cloud-based resource.

15. The computer-implemented enterprise entity provider of claim 12, wherein the first cloud services network and the second cloud services network comprise different sovereign (national or regional) clouds.

16. A method comprising:
  receiving via a user interface a request to register a domain with a first cloud services network and a first verification code;
  accessing a data structure maintained by the first cloud services network to determine that the domain has not been previously registered with the first cloud services network but has been previously registered with a second cloud services network;
  in response to determining that the domain has not been previously registered with the first cloud services network but has been previously registered with a second cloud services network, obtaining from the data structure a second verification code associated with the second cloud services network;
  determining that the first verification code matches the second verification code; and
  in response to determining that the first verification code matches the second verification code, registering the domain with the first cloud services network.

17. The method of claim 16, wherein registering the domain with the first cloud services network comprises updating the data structure to indicate that the domain is associated with the first cloud services network and the second cloud services network.

18. The method of claim 16, further comprising:
  synchronizing the data structure with other data structures maintained by one or more other cloud services networks to indicate in the other data structures that the domain is associated with the first cloud services network and the second cloud services network.

19. The method of claim 16, wherein the first verification code comprises a randomly-generated numeric or alphanumeric code.

20. The method of claim 16, further comprising:
  identifying only one of the first cloud services network and the second cloud services network as primary within the data structure.

* * * * *